United States Patent [19]

Akasawa et al.

[11] Patent Number: 4,719,153

[45] Date of Patent: Jan. 12, 1988

[54] LAMINATED ARTICLE AND PROCESS FOR PRODUCTION THEREOF

[75] Inventors: Toshiyuki Akasawa, Kurashiki; Takuji Okaya, Nagaokakyo; Masamitsu Nakabayashi, Osaka; Yuzo Furukawa, Kawanishi, all of Japan

[73] Assignees: Kuraray Co., Ltd., Okayama; Takeda Chemical Industries, Ltd., Osaka, both of Japan

[21] Appl. No.: 796,778

[22] Filed: Nov. 12, 1985

[30] Foreign Application Priority Data

Nov. 12, 1984 [JP] Japan .................... 59-238767
Dec. 7, 1984 [JP] Japan .................... 59-259647
Dec. 10, 1984 [JP] Japan .................... 59-261347
Dec. 10, 1984 [JP] Japan .................... 59-261348

[51] Int. Cl.$^4$ .................. B32B 27/36; C08F 263/04; B65D 75/00
[52] U.S. Cl. .................. 428/515; 428/516; 428/518; 428/517; 428/520; 264/176.1; 525/285; 525/301
[58] Field of Search ............ 428/516, 412, 518, 517, 428/520

[56] References Cited

U.S. PATENT DOCUMENTS 4,576,995  3/1986  Nakabayashi et al. ............ 525/285

FOREIGN PATENT DOCUMENTS 0092897  2/1983  European Pat. Off.

OTHER PUBLICATIONS

Abstract, JA 7406192, Kuraray Co. Ltd, 2/13/74, A9-4-(A18-A32).

Primary Examiner—P. C. Ives
Attorney, Agent, or Firm—Wegner & Bretschneider

[57] ABSTRACT

A laminated article which comprises
a layer (A) of a saponified ethylene—vinyl acetate copolymer resin having an ethylene content of 20–55% by mole and a degree of saponification of not less than 90% by mole; laminated with
a layer (B) of a hydrophobic thermoplastic resin; through the medium of
a layer (C) of an adhesive resin; said adhesive resin contains
a polymer (X) comprising ethylene component—vinyl acetate component—ethylenically unsaturated carboxylic acid component or anhydride thereof—styrene type vinyl compound component, and
a copolymer (Y) comprising ethylene component—vinyl acetate component,
in an amount satisfying specific formulae,
and the process for production thereof, which has a remarkably excellent adhesion between layers, as well as excellent mechanical characteristics and gas barrier properties, and is adapted to a container for foods and packaging material.

9 Claims, No Drawings

LAMINATED ARTICLE AND PROCESS FOR PRODUCTION THEREOF

FIELD OF THE INVENTION

The present invention relates to a co-extrudated laminated article having excellent gas barrier properties and improved adhesion between resin layers, and a process for the production thereof. More particularly, the present invention relates to a laminated article comprising a resin layer (A) of saponified ethylene-vinyl acetate copolymer laminated with a resin layer (B) of hydrophobic thermoplastic resin, especially polystyrene resin layer, polyvinyl chloride resin layer, or polycarbonate resin layer through the medium of resin layer (C) of ethylene-vinyl acetate resin having a specific composition range, and a process for the production thereof obtained by co-extrusion.

BACKGROUND OF THE INVENTION

Recently, there has been remarkable technological innovation in food packaging industry. For sanitary, beautiful appearance, and decreasing of weight to save carrying cost, for example it has been well known that thermoplastic resins such as polystyrene, polyvinyl chloride, polycarbonate and the like have been used in the applications of food packaging. Such hydrophobic thermoplastic resins, however, are not suitable for storage of foods, carbonated beverages, etc. for long period of time because of their less gas barrier properties against oxygen, carbon dioxide gas or the like. Especially, although impact-resistant polystyrene resin has good properties such as an excellent moldability, good balance of impact resistance and rigidity, good sanitation and the like, such polystyrene resin has insufficient gas barrier properties. Then, such polystyrene resin is not suitable for storage of foods for long period of time, either, and is limited within the applications of container for foods and packaging material. Accordingly, there have been still used many glass bottles and metal cans, and there have been many problems including nuisance of throwing away empty cans onto a road and much cost for recovery of bottles. Thus, there has been desired the development of an improved packaging and container material instead of conventional materials.

Since saponified ethylene-vinyl acetate copolymer having an ethylene content of 20–55 % by mole shows good moldability through melting, less gas permeability, high clarity, excellent gas barrier properties, such resin is superior in these characteristics for foods container and packaging material. However, it is not sufficient in other various characteristics, for example, less rigidity, less moisture resistance, and the like.

Then, it has been proposed that in order to obtain foods container or packaging material, which has an excellent gas barrier properties of saponified ethylene-vinyl acetate copolymer together with an excellent mechanical properties of polystyrene, these two kinds of resin layer are laminated. However, these two kinds of resin layer have hardly any affinity to each other, and hence, it is impossible to obtain a laminated article by a conventional simple thermal adhesion.

It has been known to produce a laminated resin article which is characterized in that polystyrene resin and resin having gas barrier properties, which have no adhesion with each other, are subjected to melt co-extrusion through the medium of an adhesive resin selected form the group of modified ethylene-vinyl acetate copolymer having unsaturated carboxylic acid or anhydride thereof in an amount of 0.001 to 10% by weight, or ionomer (cf. Japanese Laid Open Publication No. 46281/1979). The said reference discloses that as a gas barrier resin numerous resins such as saponified ethylene-vinyl acetate copolymer, polyamide resin, polyvinylidene chloride resin, thermoplastic polyester resins and the like can be laminated with polystyrene resin through the medium of an adhesive resin. The reference also discloses that such lamination can be carried out by melt co-extrusion process employing as an adhesive modified ethylene-vinyl acetate copolymer having unsaturated carboxylic acid or anhydride thereof in an amount of 0.001–10 weight % (modified EVA) or ionomer, and shows superiority thereof.

Further, Japanese Laid Open Publication No. 76366/1976 discloses that polyolefin can be laminated with saponified ethylene-vinyl acetate copolymer by using an ethylene-vinyl acetate copolymer modified by ethylenically unsaturated carboxylic acid or anhydride thereof under pressure in a melting condition. The said reference also discloses that there can be used by dilution of a modified ethylene-vinyl acetate copolymer with an ethylene-vinyl acetate copolymer, and shows superiority thereof.

However, when a polymer consisting of ethylene component-vinyl acetate component-ethylenically unsaturated carboxylic acid component or anhydride thereof are used as an adhesive resin layer for numerous laminated articles including various combinations of resins, it is usually observed that among the combination of layer (A) and layer (B) some adhesive resin can adhere to layer (A) at high strength and can not adhere to layer (B) at no strength, and vice versa. Accordingly, the property of adhesive resin layer is prepared due to a particular combination of layers to be subjected to lamination.

In the combination of saponified ethylene-vinyl acetate copolymer and polystyrene resin, some laminating process can be carried out according to the process in the aforementioned references, when lamination is carried out through compressing and heating by a hot press for long period of time, or through lamination by extruding for long period of time with extremely low rate of not more than 0.5 m/min. However, for co-extrusion lamination at the commercial operation rate, such conventional process can not produce a laminated article having a sufficient adhesion and value as a commercial product and induces troubles during molding operation.

SUMMARY OF THE INVENTION

Accordingly, the present inventors have intensively studied the relation between various characteristics and co-extrusion adhesion of adhesive resin in view point of desirable characteristics for adhesive resin during a commercial extrusion process. As the result, there has been found that sufficient adhesion can be obtained by using of an adhesive resin composition having specific grade of resins and specific range of composition even in commercial extrusion process.

The laminated article of the present invention which comprises a layer (A) of a saponified ethylene-vinyl acetate copolymer resin having an ethylene content of 20–55% by mole and a degree of saponification of not less than 90% by mole; laminated with a layer (B) of a hydrophobic thermoplastic resin; through the medium of a layer (C) of an adhesive resin; said adhesive resin contains a polymer (X) comprising ethylene component-vinyl acetate component-ethylenically unsaturated carboxylic acid component or anhydride thereof-styrene type vinyl compound component, and a copolymer (Y) comprising ethylene component-vinyl acetate component, in an amount satisfying the following formulae (I), (II), (III), (IV) and (V), and the process for production thereof.

$$|V_X - V_Y| \leq 0.30 \quad (I)$$

$$0.15 \leq V_X \cdot W_X + V_Y \cdot W_Y \leq 0.45 \quad (II)$$

$$0.01 \leq C_X \cdot W_X \leq 1 \quad (III)$$

$$1.0 \leq n \cdot S_X / C_X \leq 2.0 \quad (IV)$$

$$0.1 \leq W_X / W_Y \leq 10 \quad (V)$$

wherein, $V_X$: content of vinyl acetate in the polymer (X) (weight fraction)

$V_Y$: content of vinyl acetate in the polymer (Y) (weight fraction)

$C_X$: content of carboxylic group of the ethylenically unsaturated carboxylic acid or anhydride component thereof in the polymer (X); (meq/g), $S_X$: content of the styrene type vinyl compound component in the polymer (X); (m.mole/g), $W_X$: content of the polymer (X) (weight fraction), $W_Y$: content of the polymer (Y) (weight fraction), and n : number of carboxyl group contained in one molecule of the ethylenically unsaturated carboxylic acid or anhydride thereof According to the present invention, there can be obtained the laminated article having an excellent adhesion between layers, especially remarkably improved adhesion between layers, even when in high speed co-extrusion operation, as well as excellent mechanical characteristics and gas barrier properties. Further, the resultant laminated article is not cloudy. Therefore, the laminated article of the present invention is remarkably useful as a container for foods and packaging material.

DETAILED DESCRIPTION OF THE INVENTION

The present invention is characterized by using of as an adhesive resin of a layer (C) polymer (X) which contains ethylene component-vinyl acetate component-ethylenically unsaturated carboxylic acid or anhydride component thereof-styrene type vinyl compound component, and by using of resin composition which contains said polymer (X) and copolymer (Y) having ethylene component-vinyl acetate component in an amount satisfying the above formulae (I), (II), (III), (IV) and (V).

According to the present invention, by using of the composition which contains polymer (X) and polymer (Y) in an amount satisfying the above formulae (I), (II), (III), (IV) and (V) as an adhesive, there can be obtained remarkably improved adhesion not only through the co-extrusion in a usual operation speed, but through the co-extrusion in a high speed operation.

According to the present invention, firstly, the adhesive resin of layer (C) contains polymer (X) and copolymer (Y) in an amount satisfying the formula (I):

$$|V_X - V_Y| \leq 0.30 \quad (I)$$

When the difference between the content of vinyl acetate component in polymer (X) and that of polymer (Y), or $V_X - V_Y$ is over 0.30, the affinity of polymer (X) and (Y) to each other become extremely small to induce no excellent effect of the present invention. This seems because the fine phase separation is not suitable.

Further, when $(V_X \cdot W_X + V_Y \cdot W_Y)$ is smaller than 0.15, it undesirably induces relatively less adhesive to hydrophobic thermoplastic resin, especially polystyrene type resin, polyvinyl chloride resin, and polycarbonate resin. On the other hand, $(V_X \cdot W_X + V_Y \cdot W_Y)$ is over 0.45, it undesirably induces not only saturation of the increasing of adhesion to hydrophobic thermoplastic resin, especially polystyrene, but rather less adhesion to saponified ethylene-vinyl acetate copolymer.

When $C_X \cdot W_X$ is smaller than 0.01 meq/g, it undesirably induces remarkably less adhesion particularly to saponified ethylene-vinyl acetate copolymer in high speed operation such as the operation in the present invention, even though there can be carried out the adhesion by heat-press on long term of time or by co-extrusion at a low speed operation of not more than 0.5 m/min. When $C_X \cdot W_X$ is over 1 meq/g, it is undesirably to induce troubles such as changing color of resin layer into yellow during co-extrusion and involving of unevenness as well as remarkably clouding of polymer (X) itself and harmful influence on the external appearance of the laminated article.

When $n \cdot S_X / C_X$ is smaller than 1.0, it is undesirably to induce relative less adhesion to hydrophobic thermoplastic resins, especially polystyrene resin, polyvinyl chloride resin, and polycarbonate resin. On the other hand, $n \cdot S_X / C_X$ is over 2.0, it is undesirable to induce clouding of polymer (X) itself and harmful influence on the external appearance of the laminated article.

Furthermore, according to the present invention, the ratio of polymer (X) to polymer (Y), $(W_X / W_Y)$ is in a range of 0.1 to 10. When only one component is excess, wherein $W_X / W_Y$ is smaller than 0.1 or over 10, it induces no excellent effect of the present invention. Although the reason thereof is not necessarily clear, it seems that excess of only one component induces difference in the condition of resulting fine phase separation and in the behavior of sea-island structure (continuous phase-dispersed phase structure).

Polymer (X), which constitutes layer (C) of the adhesive resin used in the present invention, contains ethylene component, vinyl acetate component, ethylenically unsaturated carboxylic acid component or anhydride thereof, and styrene type vinyl compound component.

Suitable examples of ethylenically unsaturated carboxylic acid or anhydride thereof are acrylic monomers such as acrylic acid, methacrylic acid, and the like; α, β-unsaturated dicarboxylic acid or anhydride thereof such as maleic acid, maleic anhydride, fumaric acid, itaconic acid and itaconic anhydride, and the like. Particularly maleic anhydride is preferable.

Suitable examples of styrene type vinyl monomer are styrene, p-methylstyrene, α-methylstyrene, and the like. Particularly styrene is preferable.

It is preferably that polymer (X) has vinyl acetate content in the range of 0.03–0.45 by weight fraction.

It is preferably that the ethylenically unsaturated carboxylic acid component or anhydride thereof is attached in a range of 0.02–2 meq/g, more preferably 0.2–1.0 meq/g as carboxyl group to the polymer (X), and styrene type vinyl compound attached to the polymer (X) is 1.0 to 2.0 times by mole of the ethylenically unsaturated carboxylic acid component or anhydride thereof.

It is also preferably that polymer (X) has a melt flow rate (MI) of 0.2–30 g/10 min (190° C., 2160 g).

The process for production of polymer (X) is not specifically restricted. Polymer (X) can be produced by conventional graft-copolymerizing, wherein ethylene-vinyl acetate copolymer is subjected to graft-copolymerizing with ethylenically unsaturated carboxylic acid ar anhydride thereof and styrene type vinyl compound, for example, in the prsence of a radical initiator.

It is preferably that the ethylenically unsaturated carboxylic acid component or anhydride thereof is changed so that the carboxyl group is attached in a range of 0.02–2 meq/g, more preferably 0.2–1.0 meq/g to the polymer (X) which is obtained by graft-copolymerizing with the styrene type vinyl compound and the ethylenically unsaturated carboxylic acid or anhydride thereof.

It is preferably that the styrene type vinyl compound is charged in the ratio of styrene type vinyl composition component/ethylenically unsaturated carboxylic acid or anhydride thereof component=about 0.8/1.0 to 1.5/1.0, more preferably 1.1/1.0–1.4/1.0 by mole.

It is particularly preferably to use maleic anbydride and styrene, wherein these compounds seem to be graft-copolymerized within the copolymer (X) in the form of alternating copolymerization, and an excess of styrene against maleic anhydride seems to be jointed alone with polymer (X) as graft.

Copolymer used as Polymer (Y), which constitutes the adhesive resin layer (C) in the present invention and contains ethylene component and vinyl acetate component, is not specifically restricted. However, it is preferably that polymer (Y) has vinyl acetate content of 0.03–0.50 by weight fraction, and has melt flow rate (MI) of 0.6–60 g/10 min (190° C., 2160 g).

Particularly, it is more preferably for high speed co-extrusion that adhesive resin layer (C) used in the present invention satisfies the following formulae (I'), (II'), (III'), (IV') and (V').

$$V_X - V_Y \leq 0.20 \quad (I')$$

$$0.2 \leq V_X \cdot W_X + V_Y \cdot W_Y \leq 0.4 \quad (II')$$

$$0.05 \leq C_X \cdot W_X \leq 0.8 \quad (III')$$

$$1.0 \leq n \cdot S_X / C_X \leq 1.8 \quad (IV')$$

$$0.4 \leq W_X / W_Y \leq 2.3 \quad (V')$$

The resin used in the present invention as layer (A) is saponified ethylene-vinyl acetate copolymer having ethylene content of 20–55 mole % and a degree of saponification of not less than 90 mole %. When ethylene content is less than 20 mole %, the resulting saponified resin undesirably shows less melt moldability. When over 55 mole %, it tends to undesirably induce less gas barrier properties.

The degree of saponification of vinyl acetate is not less than 90 mole %. When less than 90 mole %, it undesirably induces less gas barrier properties as well as less various properties such as less heat resistance, water resistance, and the like.

The hydrophobic thermoplastic resin used as layer (B) may employ any resins which can be molded by heat melting.

Preferred examples used as such resins are polystyrene resins such as styrene polymer; rubber containing styrene resin which is well known as impact-resistant polystyrene produced by polymerizing of styrene monomer in the presence of butadiene-styrene rubber; acrylonitrile-butadiene-styrene resin (ABS); styrene-butadiene block copolymer having high styrene content which is well known as trasparent impact-resistant sytrene; and the like.

Another example of the preferred hydrophobic thermoplastic resin used as layer (B) are polyvinyl chloride resins series such as rigid polyvinyl chloride having no plasticizer; semi-rigid and soft polyvinyl chloride resin plasticized with phthalate esters, adipate esters, phosphate esters, polyesters plasticizer or the like; graft-copolymer produced by graft-polymerization of vinyl chloride in the presence of ethylene-vinyl acetate copolymer or polyacrylate ester; copolymer thereof with vinyl acetate, propylene, acrylate ester, vinylidene chloride, etc; and the like.

Further examples of the preferred hydrophobic thermoplastic resin used as layer (B) are polycarbonate resin. The term "polycarbonate" means the polymer wherein diol component are bonded on liner through carbonate ester bond within the molecule. Suitable examples of diol component are 4,4'-dihydroxydiphenyl-1,1 ethane, 4,4'-dihydroxydiphenyl-2,2-propane, 4,4'-dihydroxydiphenyl sulfone and the like. These resins can be obtained by a conventional method, for example, wherein carbonate ester such as diphenylcarbonate is subjected to ester exchange reaction in the presence or absence of initiator, followed by treatment under the reduced pressure, or is reacted with phosgene in the presence of acid bonding agent.

Further, hydrophobic thermoplastic resins used as layer (B) include polyolefin resins such as polyethylene, polypropylene; polyester resins such as polyethylene terephthalate; polyamice resins such as nylon; and the like.

The adhesion obtained from co-extrusion can not be estimated based on the results of the measurement of adhesion strength obtained from simple contact bonding with heat press. Mostly, the adhesion is remarkably decreased by co-extrusion. Particularly, co-extrusion with high take-off speed extremely induces decreasing of adhesion. This seems to rise from stretching the laminated article in a short term of time during cooling operation after passing through a molder as well. However, the using of adhesive resin of the present invention induces high adhesion even when co-extrusion is carried out in a take-off speed of not less than 3 m/min as above, so that it provide improved productivity and is remarkably significant in industry. The term "take-off speed" , herein, means a take-off speed at the point where the temperature of the polymer is decreased up to 40° C. during co-extrusion and cooling steps of the polymer.

Although the thickness of each layers of the laminated article thus obtained is not specifically restricted, it is preferably that layer (A) has a thickness of 5–70 μm, layer (C) has a thickness of 5–90 μm and layer (B) has a thickness of 50–1000 μm.

The resultant laminated article has a sufficient adhesion between the layers, and has an excellent mechanical characteristics of the hydrophobic thermoplastic resin, particularly polystyrene resin together with an excellent gas barrier properties of saponified ethylene-vinyl acetate copolymer, so that it is useful for foods container (cup, bottle, etc), packaging material, and the like.

The resin of layer (C) used in the present invention shows excellent effects through extrusion molding by T-die method or ring die method. Further, in blow molding, there can be shorten the cycle of molding to increase a molding rate thereof, and the resin is remarkably useful.

In the present invention, layer (B) of the hydrophobic thermoplastic resin may constitute either an inner layer or an outer layer. The laminated article may have any multi-layer structures such as structure (A)-(C)-(B), (B)-(C)-(A)-(C)-(B), (A)-(C)-(B)-(C)-(A), or the like. If desired, the hydrophobic thermoplastic resin layer (B) may be a multi-layer structure, for example, laminated layer structure of polystyrene layer - polyolefin (e.g. polyethylene, polypropylene etc.) layer. Further, the present laminated article thus obtained may be laminated with the other layer (for example, polyolefin layer such as layer polyethylene, polypropylene, or the like).

The present invention is further illustrated by the following Examples but should not be construed to be limited thereto.

In Examples, "wt %" and "mol %" mean % by weight and % by mole.

EXAMPLE 1

Using a 20 L reaction vessel, the graft copolymerization of an ethylene-vinyl acetate copolymer was carried out in accordance with the formulation described below:
Ethylene-vinyl acetate copolymer (a vinyl acetate content of 25 wt %, a melt index of 2.0 g/10 min): 1,500 g
Styrene: 54 g
Maleic anhydride: 39 g
Benzoyl peroxide: 6 g
Xylene: 4,500 ml.

Firstly, the ethylene-vinyl acetate copolymer and xylene were charged into a reaction vessel, and stirring was continued at 115° C. for 1 hour under a nitrogen atmosphere to completely dissolve the ethylene-vinyl acetate copolymer. Then, maleic anhydride and styrene were charged into the vessel, and after stirring 10 minutes, a solution of a polymerization initiator in 100 ml of xylene was poured thereto, and the graft-copolymerization reaction was continued at 115°–200° C. for 2 hours.

After polymerization reaction, 5,400 ml of methanol was poured into the reaction mixture with stirring and the precipitated powder was collected by filtration and dried.

The product contained 24.5 wt % of vinyl acetate component, 0.39 meq/g of carboxyl group content and 0.346 mmol/g of styrene component. The product shows MI measured at 190° C. under load of 2,160 g of 0.7 g/10 min.

Thus obtained polymer (X) which comprises ethylene component-vinyl acetate component-ethylenically unsaturated carboxylic acid anhydride component-styrenic vinyl compound component, and ethylene-vinyl acetate copolymer (Y) which contains 40.5 wt % of vinyl acetate component and has MI of 1.9 g/10 min, were incorporated in the ratio of $(X)/(Y) = 40/60$. This composition has the following relation and satisfies the formulae (I)–(IV):

$$|V_x - V_Y| = 0.16$$

$$V_x W_x + V_Y W_Y = 0.34$$

$$C_x W_x = 0.16$$

$$n\, S_x/C_x = 1.77$$

$$W_x/W_Y = 0.67$$

Using this adhesive resin composition as resin for layer (C); and saponified ethylene-vinyl acetate copolymer resin having $[\eta\eta] = 1.11$ (in the mixture of phenol/water = 85/15, at 30° C., dl/g), which was obtained by saponification of 99.6 mol % of vinyl acetate component in ethylene-vinyl acetate copolymer having a vinyl acetate content of 67% as resin for layer (A); and an impact-resistant polystyrene (ESTYRENE S-60, produced by Idemitsu Peterochemical Co., Ltd.) as resin for layer (B), a laminated article was obtained according to the following procedure.

Using a feed-block type co-exturder which extrudes five layers of three kinds of resin, a laminated article was produced. The feed-block type co-extruder is provided with extruders (I), (II) and (III), of which inner diameters are 120 mm$\phi$, 90 mm$\phi$ and 90 mm$\phi$, respectively. In the said extruders (I) and (II), each melted material was extruded into two layers respectively, and then onto the extruded resin from (III) was combined the extruded resin from (II) followed by that from (III) successively. The laminated article having five layers of three kinds of resin, (B)/(C)/(A)/(C)/(B), was obtained by supplying the resin of layer (B) for extruder (I), (C) for (II), and (A) for (III), and then co-extruding at a die temperature of 225° C. under the take-off speed of 5 m/min. The each thickness of layers was 100 μm for (A), 300 μm for (B), and 40 μm for (C), and the article had a good peel strength of (A)/(B); 3.5 kg/cm (peeled at 180°, 200 mm/min).

REFERENCE EXAMPLE 1

In the same manner as described in Example 1, except that styrene was not used and ethylene-vinyl acetate copolymer having a vinyl acetate content of 49.5 wt % and MI of 6.0 g/10 min was substituted for that containing vinyl acetate content of 25 wt % and MI of 2.0 g/10 min, and the amount of maleic anhydride was changed, polymer (X) having a vinyl acetate content of 49.5 wt % and a carboxyl group content of 0.42 meq/g and MI of 1.2 was obtained. The resulting polymer (X) was incorporated with ethylene-vinyl acetate copolymer (Y), which has vinyl content of 9 wt % and MI of 2.0, in a ratio of $(X)/(Y) = 45/55$. The resulting composition, having the following value:

$$|V_x - V_y| = 0.40$$

$$V_x W_x + V_y W_y = 0.27$$

$$C_x W_x = 0.19$$

$$n\, S_x/C_x = 0$$

$$W_x/W_y = 0.82$$

satisfied the formulae (II), (III), (V), but for (I) and (IV).

The laminated article having five layers of three kinds of resin, (B)/(C)/(A)/(C)/(B) was obtained in the same manner as described in Example 1 except for using the resulting adhesive resin composition for the resin of layer (C). The obtained laminated article has small irregularities across their surfaces like Japanese pear. The each thickness of layers of the article was, 45–55 μm for (A), 190–210 μm for (B), and 20–25 μm for (C). And peel strength of (A)/(B) was 0.5 kg/cm, which was insufficient.

REFERENCE EXAMPLE 2

In the same manner as described in Example 1, except that ethylene-vinyl acetate copolymer having a vinyl acetate content of 6 wt % and MI of 25.0 g/10 min was substituted for that having vinyl acetate content of 25 wt % and MI of 2.0 g/10 min, and amount of styrene and maleic anhydride were changed, polymer (X) having vinyl acetate content of 5.9 wt %, carboxyl group content of 0.38 meq/g and equimolar of styrene to maleic anhydride, and MI of 10.7 was obtained. The resulting polymer (X) was incorporated with the copolymer (Y) having a vinyl acetate content of 14 wt % and MI of 1.4, which comprises of ethylene-vinyl acetate, in a ratio of $(X)/(Y)=50/50$. The resulting composition, having the following value:

$|V_x-V_y|=0.08$ $V_xW_x+V_yW_y=0.10$ $C_xW_x=0.19$ $n\,S_x/C_x=1.0$ $W_x/W_y=1.0$ satisfied the formulae (I), (III), (IV) and (V), but for (II).

The laminated articles having five layers of three kinds of resin, (B)/(C)/(A)/(C)/(B) were obtained in the same manner as described in Example 1 by using the above resin composition for layer (C), wherein each thickness of layers was, 50μ for (A), 210μ for (B), and 20μ for (C). And peel strength of (A)/(B) was 0.1 kg/cm, which is extremely low.

REFERENCE EXAMPLE 3

In the same manner as described in Example 1, except that 112.5 g of styrene was used, there was obtained polymer (X) having a vinyl acetate content of 24.5 wt %, a carboxyl group content of 0.40 meq/g and a styrene content of 0.72 mmol/g, and MI of 0.9 g/10 min, which was remarkably cloudy.

The resulting polymer (X) was incorporated with ethylene-vinyl acetate copolymer (Y) having a vinyl acetate content of 40.5 wt % and MI of 1.9 g/10 min in a ratio of $(X)/(Y)=40/60$. The resulting composition, having the following value:

$|V_x-V_y|=0.16$ $V_xW_x+V_yW_y=0.34$ $C_xW_x=0.16$ $n\,S_x/C_x=3.6$ $W_x/W_y=0.67$ satisfied the formulae (I), (II), (III) and (V), but for (IV).

The laminated article having five layers of three kinds of resin (B)/(C)/(A)/(C)/(B) was obtained in the same manner as described in Example 1 except that the resulting adhesive resin composition was used for layer (C). The each thickness of layers of these articles was, 100μ for (A), 300μ for (B), and 40μ for (C). The resulting article is insufficient to be used because of the cloudiness of layer (C), which affects on the surface of the laminated article.

EXAMPLE 2

In the same manner as described in Example 1, except that ethylene-vinyl acetate copolymer having a vinyl acetate content of 33.5 wt % and MI of 2.3 g/10 min was substituted for that having a vinyl acetate content of 25 wt % and MI of 2.0 g/10 min, and the amount of styrene and maleic anhydride were changed, there was obtained polymer (X) having a vinyl content of 33.0 wt %, carboxyl group content of 0.42 meq/g and equimolar of styrene component to maleic anhydride component. The polymer (X) was incorporated with the ethylene-vinyl acetate copolymer (Y) having vinyl acetate content of 33.5 wt % and MI of 2.3 g/10 min, in a ratio of $(X)/(Y)=35/65$. The resulting composition, having the following value:

$|V_x-V_y|=0.005$ $V_xW_x+V_yW_y=0.333$ $C_xW_x=0.147$ $n\,S_x/C_x=1.0$ $W_x/W_y=0.54$ satisfied the formulae (I), (II), (III), (IV) and (V).

This adhesive resin composition was used as resin for layer (C), and saponified ethylene-vinyl acetate copolymer resin having a vinyl acetate content of 56 mol %, and $[\eta]=0.96$ (in the mixture of phenol/water =85/15, at 30° C., dl/g), which was obtained by saponifying 99.5 mol % of vinyl acetate component, was used as resin for layer (A). And Styron 470 (impact-resistant polystyrene produced by Asahi Daw KK) was used as resin for layer (B).

Using a feed-block type co-extruder which extrudes three layers of three kinds of resin, a laminated article was produced. The feed-block type co-extruder is provided with three extruders (I), (II) and (III), of which inner diameters are 120 mmφ, 90 mmφ and 90 mmφ, respectively. In the said co-extruder, the resins were combined onto the resin from the extruder (II) as inner layer successively. By supplying resins (A), (C) and (B) for extruders (I), (II), and (III), respectively, co-extrusion was carried out at the die temperature of 225° C. under the take-off speed of 7 m/min to obtain a fine laminated article having three layers, (A)/(C)/(B). The each thickness of layers was (A); 60 μm, (B); 290 μm, (C); 25 μm; and the product had a peel strength of (A)/(B); 3.2 kg/cm (peeled at 180°, 200 mm/min).

REFERENCE EXAMPLE 4

In the same manner as described in Example 1, except that ethylene-vinyl acetate copolymer having vinyl acetate content of 25 wt % and MI of 6 g/10 min, was substituted for that having vinyl acetate content of 25 wt % and MI of 2.0 g/10 min, and the amount of styrene and maleic anhydride were changed, there was obtained the polymer (X) having a vinyl acetate content of 24.5 wt %, a carboxyl group content of 0.11 meq/g and equimolar of styrene against maleic anhydride. The said polymer (X) was incorporated with the ethylene-vinyl acetate copolymer (Y) having vinyl acetate content of 6 wt % and MI of 25 g/10 min, in a ratio of $(X)/(Y)=95/5$. The resulting composition, having the following value:

$|V_x-V_y|=0.19$ $V_xW_x+V_yW_y=0.24$ $n\,S_x/C_x=1.0$ $W_x/W_y=19$ satisfied the formulae (I), (II), (III) and (IV), but for (V).

The laminated article having three layers of three kinds, (A) / (C) / (B) were obtained by co-extrusion in the same manner as described in Example 1, except that this resin composition was used for (C) layer. The each thickness of layers of the resulting article was, 42µ for (A), 295µ for (B), and 21µ or (C). Peel strength of (A)/(B) was 0.3 kg/cm, which was insufficient.

REFERENCE EXAMPLE 5

The polymer (X) having a vinyl acetate content of 28 wt %, a carboxyl group content of 0.015 meq/g, equimolar of styrene against maleic anhydride and MI of 3.2 g/10 min, was incorporated with the copolymer (Y) having a vinyl acetate content of 45 wt % and MI of 2 g/10 min, in a ratio of $(X)/(Y)=50/50$. The resulting composition, having the following value:

$|V_x-V_y|=0.17$ $V_xW_x+V_yW_y=0.36$ $C_xW_x=0.0073$ $n\,S_x/C_x=1.0$ $W_x/W_y=1.0$ satisfied the formulae (I), (II), (IV) and (V), but for (III).

The laminated articles having three layers of three kinds, (A)/(C)/(B) were obtained by extrusion in the same manner as described in Example 1, except that this resin composition was used as resin for layer (C). The each thickness of layers of these articles was, 40 µm for (A), 290 µm for (B), and 22 µm for (C). Peel strength of (A)/(B) was 0.1 kg/cm, which was extremely low.

EXAMPLE 3

Using a 20 L reaction vessel, the graft copolymerization of an ethylene-vinyl acetate copolymer was carried out in accordance with the formulation described below:
Ethylene-vinyl acetate copolymer (a vinyl acetate content of 25 wt %, a melt index of 2.0 g/10 min): 1,500 g
tyrene: 54 g
Maleic anhydride: 39 g
Benzoyl peroxide: 6 g
Xylene: 4,500 ml.

Firstly, the ethylene-vinyl acetate copolymer and xylene were charged into a reaction vessel, and stirring was continued at 115° C. for one hour under a nitrogen atmosphere to completely dissolve the ethylene-vinyl acetate copolymer. Then, maleic anhydride and styrene were charged into the vessel, and after stirring 10 minutes, a solution of a polymerization initiator in 100 ml of xylene was poured thereto, and the graft-copolymerization reaction was continued at 115°–200° C. for 2 hours.

After polymerization reaction, 5,400 ml of methanol was poured into the reaction mixture with stirring and the precipitated powder was collected by filtration and dried.

The product had a vinyl acetate content of 24.5 wt %, a carboxyl group content of 0.39 meq/g and a styrene content of 0.35 mmol/g. And MI measured at 190° C. under load of 2,160 g was 0.7 g/10 min.

Thus obtained polymer (X) comprising ethylene-vinyl acetate-ethylenically unsaturated carboxylic acid anhydride-styrenic vinyl compound was incorporated with copolymer (Y) having a vinyl acetate content of 39.2 wt % and MI of 6 g/10 min in a ratio of $(X)/(Y)=40/60$. The resulting composition contained 34 wt % of vinyl acetate content, 0.16 meq/g of carboxyl group content and 0.14 mmol/g of styrene content.

By using as layer (C) this adhesive composition, as layer (A) saponified ethylene-vinyl acetate copolymer resin having 56 mol % of vinyl acetate content and $[\eta]=0.96$ (in the mixture of phenol/water=85/15, at 30° C., dl/g), which was obtained by saponifying 99.6 mol % of vinyl acetate, and as layer (B) polyvinyl chloride resin without plasticizer, co-extruding was carried out at a die temperature of 200° C. to give a laminated article of (B)/(C)/(A) having a good appearance. The each thickness of layers was 30 µm for (A), 200 µm for (B) and 20 µm for (C). And the article had a good peel strength of (A)/(B) (peeled at 180°, 200 mm/min) of 3.1 kg/cm.

REFERENCE EXAMPLE 6

In the same manner as described in Example 3, using a 20 L reaction vessel, the graft copolymerization of an ethylene-vinyl acetate copolymer was carried out in accordance with the formulation described below:
Ethylene-vinyl acetate copolymer (a vinyl acetate content of 25 wt %, a melt index of 2.0 g/10 min): 1,500 g
Maleic anhydride: 39 g
Benzoyl peroxide: 10 g
Xylene: 4,500 ml
Temperature for polymerization: 120° C.
Period of time for polymerization: 8 hr.

There was obtained a graft copolymer having MI of 0.8 g/10 min and a maleic anhydride content of 0.37 meq/g without styrene. This copolymer was co-extruded in the same manner as described in Example 3. The resulting laminated article had a peel strength of 0.8 kg/cm, but had small irregularities across the surface and was not suitable for practical use.

REFERENCE EXAMPLE 7

Polyethylene (Mirason 45, produced by Mitsui Petrochemical Co., Ltd) (Y) was incorporated with the polymer (X) obtained in Example 3, which comprises ethylene, vinyl acetate, ethylenically unsaturated carboxylic acid anhydride and styrene in a ratio of $(X)/(Y)=40/60$. The resulting composition contained 9.8 wt % of vinyl acetate component, 0.16 meq/g of carboxylic group content and 0.14 mmol/g of styrene component.

In the same manner as described in Example 3, co-extrusion was carried out by using the resulting composition as resin for layer (C). The resulting laminated article had an extremely low peel strength of 0.1 kg/cm.

REFERENCE EXAMPLE 8

Ethylene/vinyl acetate copolymer (Y) containing 19 wt % of vinyl acetate content was incorporated with the polymer (X) obtained in Example 3, which comprises ethylene, vinyl acetate, ethylenically unsaturated carboxylic anhydride and styrene in a ratio of $(X)/(Y)=2/98$. The resulting composition contained 19.1 wt % of vinyl acetate component, 0.006 meq/g of carboxylic group content and 0.007 mmol/g of styrene component.

In the same manner as described in Example 3, co-extrusion was carried out by using the resulting composition as resin for layer (C). The laminated article obtained had an extremely low peel strength of 0.2 kg/cm.

REFERENCE EXAMPLE 9

In the same manner as described in Example 3, except that 112.5 g of styrene was used, there was obtained the polymer (X) containing 24.5 wt % of vinyl acetate component, 0.40 meq/g of carboxyl content and 0.72 mmol/g of styrene component and having MI of 0.9 g/10 min, which was too cloudy to be use as the resin for layer (C) of the present invention.

EXAMPLE 4

In the same manner as described in Example 3, except that ethylene-vinyl acetate copolymer containing 33.5 wt % of vinyl acetate component and having 2.0 g/10 min of MI was substituted for ethylene-vinyl acetate copolymer containing 25 wt % of vinyl acetate component and having 2.0 g/10 min of MI, and the amount of styrene and maleic anhydride were changed, there was obtained the polymer (X) containing 33.0 wt % of vinyl acetate component, 0.42 meq/g of carboxyl content and equimolar of styrene against maleic anhydride, and having 0.9 g/10 min of MI.

The resulting polymer (X) was incorporated with the ethylene-vinyl acetate copolymer (Y) containing 33.5 wt % of vinyl acetate component, in a ratio of $(X)/(Y)=50/50$. The resulting composition contained 33.3 wt % of vinyl acetate component and 0.21 meq/g of carboxylic group content.

Using for layer (C) this adhesive composition, and as layer (A) saponified ethylene-vinyl acetate copolymer resin containing 56 mol % of vinyl acetate component, and having $[\eta]=0.96$ (in the mixture of phenol/water=85/15, at 30° C., dl/g), which was obtained by saponifying 99.5 mol % of vinyl acetate and as layer (B) poly vinyl acetate resin plasticized with 35 wt % of dioctylphthalate, co-extrusion was carried out at a die temperature of 200° C. to obtain a fine laminated article having five layers of three kinds of resin, (B)/(C)/(A)/(C)/(B). The each thickness of layers was 10 μm for (A), 100 μm for (B) and 5 μm for (C). And the article had a good peel strength of (A)/(B); 1.0 kg/cm (T peel test at 200 mm/min).

REFERENCE EXAMPLE 10

Ethylene-vinyl acetate copolymer (Y) containing 45 wt % of vinyl acetate component was incorporated with the polymer (X) obtained in Example 4, which comprises ethylene, vinyl acetate, ethylenically unsaturated carboxylic anhydride and styrene in a ratio of $(X)(Y)=20/80$. The resulting composition contained 42.6 wt % of vinyl acetate component and 0.08 meq/g of carboxylic group content.

In the same manner as described in Example 4, co-extrusion was carried out by using the resulting adhesive composition as (C) layer resin. The resulting laminated article had wavy pattern across their surface resulting in less value for commercial use. And they had a bad peel strength of 0.4 kg/cm.

EXAMPLE 5

Using a 20 L reaction vessel, the graft copolymerization of an ethylene-vinyl acetate copolymer was carried out in accordance with the formulation described below:

Ethylene-vinyl acetate copolymer
(a vinyl acetate content of 25 wt %,
a melt index of 2.0 g/10 min): 1,500 g
Styrene: 54 g
Maleic anhydride: 39 g
Benzoyl peroxide: 6 g
Xylene: 4,500 ml.

Firstly, the ethylene-vinyl acetate copolymer and xylene were charged into a reaction vessel, and stirring was continued at 115° C. for one hour under a nitrogen atmosphere to completely dissolve the ethylene-vinyl acetate copolymer. Then, maleic anhydride and styrene were charged into the vessel, and after stirring 10 minutes, a solution of a polymerization initiator in 100 ml of xylene was poured thereto, and the graft-copolymerization reaction was continued at 115–200° C. for 2 hours.

After polymerization reaction, 5,400 ml of methanol was poured into the reaction mixture with stirring and the precipitated powder was collected by filtration and dried.

The product contained 24.5 wt % of vinyl acetate component, 0.39 meq/g of carboxylic group content and 0.35 mmol/g of styrene component. And MI measured at 190° C. under load of 2,160 g was 0.7 g/10 min.

Thus obtained polymer (X) comprising ethylene-vinyl acetate-styrenic vinyl compound and copolymer (Y) comprising ethylene-vinyl acetate-ethylenically unsaturated carboxylic anhydride-styrenic vinyl compound was incorporated with copolymer (Y) containing 39.2 wt % of vinyl acetate component and having 6 g/10 min of MI in the ration of $(X)/(Y)=40/60$. This resulting composition contained 34.0 wt % of vinyl acetate component, 0.16 meq/g of carboxyl content and 0.14 mmol/g of styrene component.

By using this adhesive composition as resin for layer (C), saponified ethylene-vinyl acetate copolymer resin, which was obtained by saponification of 99.6 mol % of vinyl acetate of ethylene-vinyl acetate copolymer resin containing 67 mol % of vinyl acetate component, and having $=1.11$ (in the mixture of phenol/water $=85/15$, at 30° C., dl/g), for layer (B), and polycarbonate (produced by Mitsubishi Gas Chemical Co., Ltd., sold under trademark of Upiron E-2000) for resin for layer (B), the laminated article was obtained according to the following method:

Using a multimanifold type co-extruder which extrudes five layers of three kinds of resin, a laminated article was extruded. The co-extruder was provided with an extruder (I), an extruder (II) and an extruder (III), of which inner diameter are 120 mmφ, 60 mmφ and 90 mm ®, respectively. In the said extruders (I) and (II), the melt materials were respectively divided into two layers. Then, the extrudate from (III) was combined with that from (II) followed by that from (I)

successively. The laminated article having a good appearance and five layers of three kinds of resin, (B)/(C)/(A)/(C)/(B), was obtained by supplying resin for (B) layer for extruder (I), (C) for (II), and (A) for (III), then co-extruding at die temperature of 280° C. under a take-off speed of 12 m/min. The each thickness of layers was 10 μm for (A), 70 μm for (B), and 3 μm for (C), and the article had a good peel strength of (A)/(B); 0.9 kg/cm (T peel test at 200 mm/min).

REFERENCE EXAMPLE 11

Using a 20 L reaction vessel, the graft copolymerization of an ethylene-vinyl acetate copolymer was carried out in accordance with the formulation described below:

Ethylene-vinyl acetate copolymer (a vinyl acetate content of 25 wt %, a melt index of 2.0 g/10 min): 1,500 g
Maleic anhydride: 39 g
Benzoyl peroxide: 10 g
Xylene: 4,500 ml
Polymerization temperature: 120° C.
Period of time for polymerization: 8 hr.

The graft copolymer containing 0.37 meq/g of maleic anhydride component and no styrene was obtained. And co-extrusion was carried out using this copolymer in the same manner as described in Example 5. The resulting laminated article had a 0.6 kg/cm of peel strength, however, showed small irregularities across the surface, therefore unsuitable for practical use.

REFERENCE EXAMPLE 12

Polyethylene (Mirason 45, produced by Mitui Petrochemical Co., Ltd) (Y) was incorporated with the polymer (X) obtained in Example 5, which comprises ethylene, vinyl acetate, ethylenically unsaturated carboxylic anhydride and styrene in a ratio of $(X)/(Y)=40/60$. The resulting composition contained 9.8 wt % of vinyl acetate component, 0.16 meq/g of carboxylic group content and 0.14 mmol/g of styrene component.

In the same manner as described in Example 5, co-extrusion was carried out by using the resulting composition as resin for layer (C). The resulting laminated article had an extremely low peel strength of 0.005 kg/cm.

REFERENCE EXAMPLE 13

Ethylene-vinyl acetate copolymer (Y) containing 19 wt % of vinyl acetate was incorporated with the polymer (X) obtained in Example 5, which comprises ethylene, vinyl acetate, ethylenically unsaturated carboxylic anhydride and styrene in a ratio of $(X)/(Y)=2/98$. The resulting composition contained 19.1 wt % of vinyl acetate component, 0.008 meq/g of carboxylic group content and 0.007 mmol/g of styrene component.

In the same manner as described in Example 5, co-extrusion was carried out by using the resulting composition as (C) layer resin. The resulting laminated article had an extremely low peel strength of 0.1 kg/cm.

REFERENCE EXAMPLE 14

In the same manner as described in Example 5, except that 112.5 g of styrene was used, there was obtained copolymer (X) containing 24.5 wt % of vinyl acetate component, 0.40 meq/g of carboxylic group content and 0.72 mmol/g of styrene component and having 0.9 g/10 min of MI, which showed remarkably cloudy appearance to use in the present invention.

EXAMPLE 6

In the same manner as described in Example 5, except that ethylene-vinyl acetate copolymer containing 33.5 wt % of vinyl acetate component and having 2.0 g/10 min of MI was substituted for ethylene-vinyl acetate copolymer containing 25 wt % of vinyl acetate component and having 2.0 g/10 min of MI, and the amount of styrene and maleic anhydride were changed, there was obtained the polymer (X) containing 33 wt % of vinyl acetate component, 0.42 meq/g of carboxylic group content and equimolar of styrene against maleic anhydride.

Thus obtained polymer (X) and copolymer ethylene-vinyl acetate polymer (Y) containing 33.5 wt % of vinyl acetate component were incorporated in the ratio of $(X)/(Y)=50/50$. The resulting composition contained 33.3 wt % of vinyl acetate component and 0.21 meq/g of carboxyl group content.

This adhesive composition was used as resin for layer (C), saponified ethylene-vinyl acetate copolymer resin, which was obtained by saponification of 99.5 mol % of vinyl acetate of ethylene-vinyl acetate copolymer resin containing 56 mol % of vinyl acetate, and having $[\eta]=0.96$ (in the mixture of phenol/water $=85/15$, at 30° C., dl/g), was used as resin for layer (B), and polycarbonate (produced by Mitsubishi Kasei Co., Ltd., sold under trademark of NOVAREX 7030A) was used as resin for layer (B)

Using a feed-block type co-extruder which extrudes three layers of three kinds of resin, a laminated article was produced. The co-extruder is provided with an extruder (I), an extruder (II) and an extruder (III), of which inner diameters are 95 mmφ, 60 mmφ and 110 mmφ, respectively. In the co-extruder, the extrudates are combined to make the extrudate from (II) sandwiched by others. The laminated article having three layers of three kinds of resin, (A)/(C)/(B), were obtained by supplying the resin of layer (A) for extruder (I), (C) for (II), and (B) for (III), then co-extruding at a die temperature of 280° C. under take-off speed of 8 m/min. The each thickness of layers was 35μ for (A), 200μ for (B), and 20μ for (C), and the article had a good peel strength of (A)/(B); 1.8 kg/cm.

REFERENCE EXAMPLE 15

Ethylene-vinyl acetate copolymer (Y) containing 45 wt % of vinyl acetate component was incorporated with the polymer (X) obtained in Example 6, which comprises ethylene, vinyl acetate, ethylenically unsaturated carboxylic anhydride and styrene in a ratio of $(X)/(Y)=20/80$. The resulting composition contained 42.6 wt % of vinyl acetate component and 0.08 meq/g of carboxylic group content.

In the same manner as described in Example 3, co-extrusion was carried out by using the resulting adhesive composition as (C) layer resin. The resulting laminated article had wavy pattern across their surface resulting in less suitable for commercial use. And they had a bad peel strength of 0.1 kg/cm.

What is claimed is:

1. A laminated article which comprises
   a layer (A) of a saponified ethylene-vinyl acetate copolymer resin having an ethylene content of 20–55 % by mole and a degree of saponification of not less than 90 % by mole; laminated with
   a layer (B) of a hydrophobic thermoplastic resin; through the medium of
   a layer (C) of an adhesive resin; said adhesive resin contains
   a polymer (X) comprising ethylene component-vinyl acetate component-ethylenically unsaturated carboxylic acid component or anhydride thereof-styrene type vinyl compound component, and a copolymer (Y) comprising ethylene component-vinyl acetate component, in an amount satisfying the following formulae (I), (II), (III), (IV) and (V)

$$|V_X - V_Y| \leq 0.30 \tag{I}$$

$$0.15 \leq V_X \cdot W_X + V_Y \cdot W_Y \leq 0.45 \tag{II}$$

$$0.01 \leq C_X \cdot W_X \leq 1 \tag{III}$$

$$1.0 \leq n \cdot S_X / C_X \leq 2.0 \tag{IV}$$

$$0.1 \leq W_X / W_Y \leq 10 \tag{V}$$

wherein, $V_X$: content of vinyl acetate in the polymer (X) (weight fraction)

$V_Y$: content of vinyl acetate in the polymer (Y) (weight fraction)

$C_X$: content of carboxylic group of the ethylenically unsaturated carboxylic acid or anhydride component thereof in the polymer (X); (meq/g), $S_X$: content of the styrene vinyl compound component in the polymer (X); (m.mole/g), $W_X$: content of the polymer (X) (weight fraction), $W_Y$: content of the polymer (Y) (weight fraction), and n : number of carboxyl group contained in one molecule of the ethylenically unsaturated carboxylic acid or anhydride thereof.

2. A laminated article according to claim 1, wherein the hydrophobic thermoplastic resin is a polystyrene resin.

3. A laminated article according to claim 1, wherein the hydrophobic thermoplastic resin is a polyvinyl chloride resin.

4. A laminated article according to claim 1, wherein the hydrophobic thermoplastic resin is a polycarbonate resin.

5. A laminated article according to claim 1, wherein the adhesive resin contains the polymer (X) and the polymer (Y) in an amount satisfying the following formulae (I'), (II'), (III'), (IV') and (V')

$$|V_X - V_Y| \leq 0.20 \tag{I'}$$

$$0.2 \leq V_X \cdot W_X + V_Y \cdot W_Y \leq 0.4 \tag{II'}$$

$$0.05 \leq C_X \cdot W_X \leq 0.8 \tag{III'}$$

$$0.05 \leq C_X \cdot X_X \leq 0.8 \tag{III''}$$

$$1.0 \leq n \cdot S_X / C_X \leq 1.8 \tag{IV'}$$

$$0.4 \leq W_X / W_Y \leq 2.3 \tag{V'}$$

6. A laminated article produced by a process which comprises:
co-extruding
a layer (A) of a saponified ethylene-vinyl acetate copolymer resin having an ethylene content of 20–55% by mole and a degree of saponification of not less than 90% by mole; and
a layer (B) of a hydrophobic thermoplastic resin; through the medium of
a layer (C) of an adhesive resin; said resin contains
a copolymer (X) comprising ethylene component-vinyl acetate component-ethylenically unsaturated carboxylic acid component or anhydride thereof-styrene type vinyl compound component, and
a polymer (Y) comprising ethylene component-vinyl acetate component,
in an amount satisfying the following formulae (I), (II), (III), (IV) and (V), and
taking off the resulting extrudate at a rate of not less then 3 m/min, $$|V_x - V_y| \leq 0.30 \tag{I}$$

$$0.15 \leq V_x \cdot W_x + V_y \cdot W_y \leq 0.45 \tag{II}$$

$$0.01 \leq C_x \cdot W_x \leq 1 \tag{III}$$

$$1.0 \leq n \cdot S_x / C_x \leq 2.0 \tag{IV}$$

$$0.1 \leq W_x / W_y \leq 10 \tag{V}$$

wherein, $V_x$: content of vinyl acetate in the polymer (X) (weight fraction)

$V_y$: content of vinyl acetate in the polymer (Y) (weight fraction)

$C_x$: content of carboxylic group of the ehtylenically unsaturated carboxylic acid or anhydride component thereof in the polymer (X); (meq/g), $S_x$: content of the styrene type vinyl compound component in the polymer (X) (m.mole/g), $W_x$: content of the polymer (X) (weight fraction), $W_y$: content of the polymer (Y) (weight fraction), and n: number of carboxyl group contained in one molecule of the ethylenically unsaturated carboxylic acid or anhydride thereof.

7. A laminated article according to claim 6, wherein the hydrophobic thermoplastic resin is a polystyrene resin.

8. A laminated article according to claim 6, wherein the hydrophobic thermoplastic resin is a polyvinyl chloride resin.

9. A laminated article according to claim 6, wherein the hydrophobic thermoplastic resin is a polycarbonate resin.

* * * * *